United States Patent
Brannock et al.

(10) Patent No.: US 11,783,064 B2
(45) Date of Patent: Oct. 10, 2023

(54) TECHNIQUES TO PROVIDE HARDWARE ENFORCED PROTECTION ENVIRONMENT FOR A SYSTEM MANAGEMENT MODE

(71) Applicant: INTEL CORPORATION, Santa Clara, CA (US)

(72) Inventors: Kirk D. Brannock, Hillsboro, OR (US); Barry E. Huntley, Hillsboro, OR (US)

(73) Assignee: INTEL CORPORATION, Sant Clara, CA (US)

( * ) Notice: Subject to any disclaimer, the term of this patent is extended or adjusted under 35 U.S.C. 154(b) by 1050 days.

(21) Appl. No.: 15/941,992

(22) Filed: Mar. 30, 2018

(65) Prior Publication Data

US 2019/0042780 A1 Feb. 7, 2019

Related U.S. Application Data

(60) Provisional application No. 62/530,593, filed on Jul. 10, 2017.

(51) Int. Cl.
*G06F 21/62* (2013.01)
*G06F 21/64* (2013.01)
*G06F 21/74* (2013.01)

(52) U.S. Cl.
CPC .......... *G06F 21/6218* (2013.01); *G06F 21/64* (2013.01); *G06F 21/74* (2013.01)

(58) Field of Classification Search
CPC ....... G06F 21/6218; G06F 21/64; G06F 21/74
See application file for complete search history.

(56) References Cited

U.S. PATENT DOCUMENTS

| | | | | |
|---|---|---|---|---|
| 7,043,616 B1 * | 5/2006 | McGrath | ............. | G06F 9/30101 711/163 |
| 2003/0041248 A1 * | 2/2003 | Weber | ..................... | G06F 21/85 713/182 |
| 2003/0226022 A1 * | 12/2003 | Schmidt | .................. | G06F 21/71 713/189 |
| 2005/0114639 A1 * | 5/2005 | Zimmer | ................ | G06F 9/4401 712/244 |
| 2007/0050586 A1 * | 3/2007 | Shin | ..................... | G06F 12/1466 711/163 |
| 2018/0032447 A1 * | 2/2018 | Kaplan | ................ | G06F 9/45558 |

OTHER PUBLICATIONS

Intel, "Intel 64 and IA-32 Architectures Software Developer's Manual, vol. 3C", Sep. 2013, pp. 1-22, from https://web.archive.org/web/20130715000000*/https://www.intel.com/content/dam/www/public/us/en/documents/manuals/64ia-32-architectures-software-developer-vol-3c-part-3-manual.pdf (Year: 2013).*

* cited by examiner

*Primary Examiner* — Kevin Bechtel
*Assistant Examiner* — Forrest L Carey
(74) *Attorney, Agent, or Firm* — KDW Firm PLLC

(57) ABSTRACT

Various embodiments are generally directed to an apparatus, method and other techniques to detect an access request to access a computing resource while in a system management mode (SMM), determine a bit of a lock register is set to enable access to a bitmap associated with the computing resource, the bitmap to indicate an access policy for the computing resource, and determine whether the access request violate the access policy set in the bitmap. Embodiments may also include performing the access request if the access request does not violate the access policy, and causing a fault if the access request does violate the access policy.

20 Claims, 8 Drawing Sheets

600

```
DETECT AN ACCESS REQUEST TO ACCESS A COMPUTING
RESOURCE WHILE IN A SYSTEM MANAGEMENT MODE (SMM)
605
```

```
DETERMINE A BIT OF A LOCK REGISTER IS SET TO ENABLE
ACCESS TO A BITMAP ASSOCIATED WITH THE COMPUTING
RESOURCE, THE BITMAP TO INDICATE AN ACCESS POLICY
FOR THE COMPUTING RESOURCE
610
```

```
DETERMINE WHETHER THE ACCESS REQUEST VIOLATE THE
ACCESS POLICY SET IN THE BITMAP
615
```

```
PERFORM THE ACCESS REQUEST IF THE ACCESS REQUEST
DOES NOT VIOLATE THE ACCESS POLICY
620
```

```
CAUSE A FAULT IF THE ACCESS REQUEST DOES VIOLATE
THE ACCESS POLICY
625
```

*FIG. 6*

TECHNIQUES TO PROVIDE HARDWARE ENFORCED PROTECTION ENVIRONMENT FOR A SYSTEM MANAGEMENT MODE

RELATED APPLICATIONS

This application claims the benefit of and priority to previously filed U.S. provisional patent application Ser. No. 62/530,593 filed Jul. 10, 2017. The disclosure of U.S. Provisional Patent Application Ser. Nos. 62/530,593 is hereby incorporated herein by reference in its respective entirety for all purposes.

TECHNICAL FIELD

Embodiments described herein generally relate to techniques to provide a hardware enforced memory protection environment.

BACKGROUND

A computer system typically includes a number of hardware components including a processor to process information and data. The processor may operate in a normal mode and a protected mode such as the system management mode (SMM). SMM allows system developers and operators to provide functions, such as power management or security, in a manner that is transparent to the operating system (OS) and other application programs. The processor may enter the SMM via a hardware interrupt referred to as a System Management Interrupt (SMI).

After receiving the SMI, the processor may store the current execution state referred to as the 'context' to a System Management Random Access Memory (SMRAM) before executing instructions, such as a SMI handler. In some instances, an intruder may write malicious pieces of code to initiate an attack to take over the processor and system while the processor is operating in SMM.

BRIEF DESCRIPTION OF THE DRAWINGS

FIG. 6 illustrates an example of a second logic flow.

DETAILED DESCRIPTION

Figure 1:
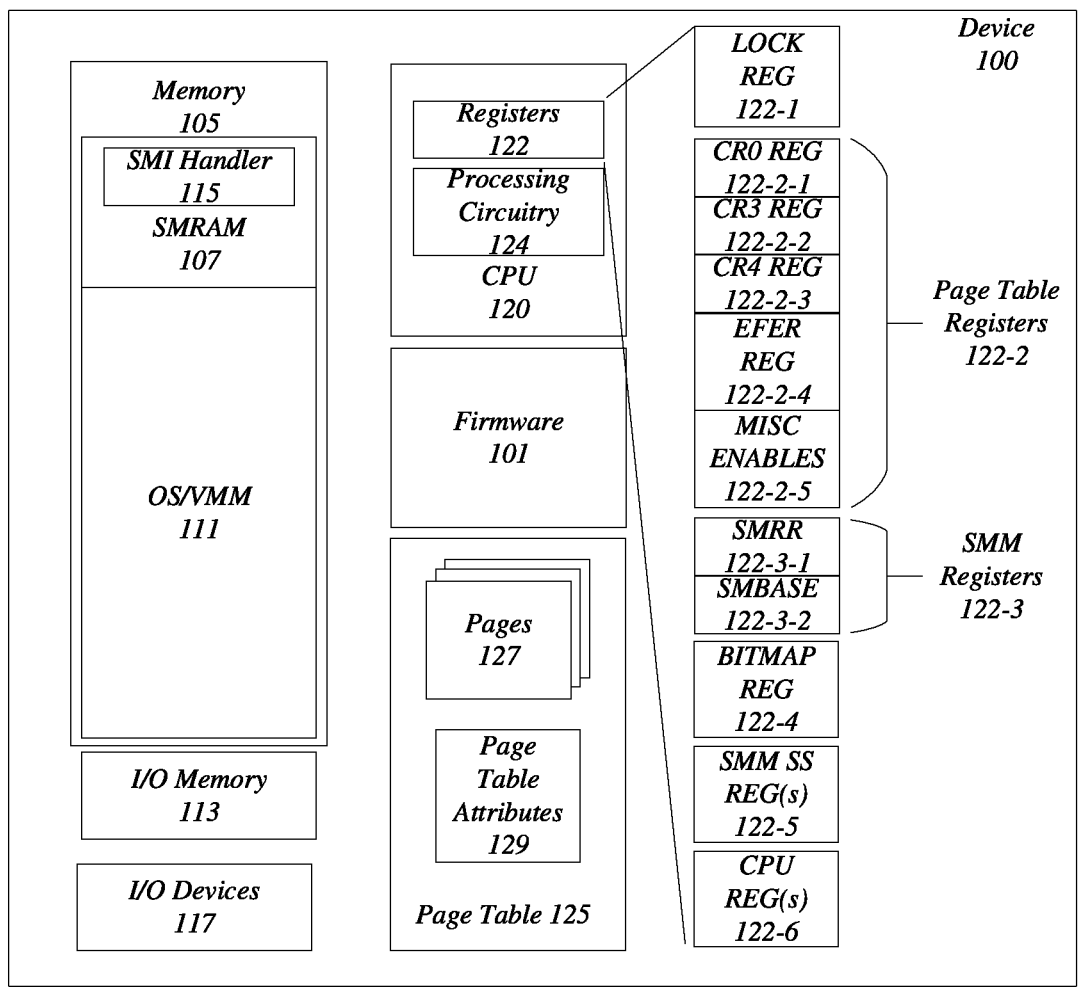
FIG. 1 illustrates an example embodiment of a device.

Various embodiments may generally be directed to eliminating a set of capabilities from the SMM and SMI handler that are necessary for runtime code stream modification, thereby dramatically reducing the possibility of a malicious code injection attack. Typically, the SMM and SMI handler needs a high level of privilege to establish itself in a computer system during the boot sequence, e.g., to configure memory and install/relocate code. Once, the SMI handler and other configurations are complete for the SMM, the high level of privilege is locked down during run-time operations.

For example, the SMM and the SMI handler may be locked down by configuring paging and page table attributes and then using one or more registers to lock the page table and attributes. More specifically, to configure the SMM and SMI handler, embodiments may include allocating a portion of the memory as SMRAM which may include the SMI handler for entering the SMM. Further, embodiments may include generating a page table for the SMM, which may include one or more mapped pages to map virtual addresses to physical addresses for the SMM. The page table attributes may include one or more permissions and settings that may enable or disable one or more instructions from reading, writing, and executing data and code that may be mapped by the page table. Once the page table attributes are set, a lock register may be used to prevent modification of the page table attributes and page table. Thus, using the page table attributes in conjunction with setting the lock register may provide a more secure computing environment while a device is operating in SMM.

In some embodiments, the lock register may be used to provide additional access controls for other model-specific registers, input/output memory, circuitry, and devices, SMM state save, and other hardware registers as will be discussed in more detail below. The lock register may be a model-specific register, such SMM_SUPOVR_STATE_LOCK MSR. Other MSRs, such as SMM_IO_MSR_BITMAP_ADDR MSR may be also be utilized to the control access.

Embodiments discussed herein provide improvements over current technology, such as SMI Transfer Monitor (STM) because they are less complex, and require a simpler trusted computer base (TCB) and smaller size. STM has additional drawbacks relative to embodiments discussed herein, e.g., STM is only functional when specifically enabled and turned on by a virtual machine monitor (VMM). In contrast, embodiments discussed herein takes effect and becomes functional at the time of power-on-self-test (POST) when the SMI handler is locked down. No action by the operating system is necessary in order to gain the benefit of isolation from the SMM.

Further, if the STM is not launched as part of a trusted execution technology (TXT) launch, the solution is subject to any attacks on SMM prior to launch. This can be an arbitrarily long amount of time, but by definition will include Option read-only memory (ROM) execution as well as OS loader execution. Embodiments discussed herein are not subject to attacks on SMM that occur after SMM lockdown since the restrictions on SMM hardware (HW) access cannot be modified by SMM. In other words, even if the SMI handler has an exploitable runtime bug, such a bug cannot change the SMM isolation properties.

As mentioned, the STM adds a substantial amount of complexity to the platform and the SMI handling in general. This adds latency and unpredictability to SMM which is not good for SMM. Furthermore, and because the STM itself (which is a full hypervisor) is within the TCB of the VMM and the OS, any exploitable bugs in the STM itself undermine the solution. In contrast, embodiments discussed herein do not change normal SMM execution at runtime, so all latency and SMM predictability remains unchanged. Additionally, only a very small piece of runtime code is within the TCB. This code is no more than ten's (10's) of instructions in length, consumes no data, and takes no branches. Securing this very small footprint is much more achievable.

Embodiments discussed herein may also provide additional improvements over other solutions, such as software guard extensions (SGXs) and other encrypted memory solutions. While SGX and other encrypted memory solutions can defend confidentiality and integrity of code and data within an enclave against SMM threats, it does not currently have any solution for local I/O. If the enclave needs to interact with the platform hardware, say to get user input, such flows go through the normal OS stack where they are subject to observation and tampering. This type of attack can be mitigated to some degree by OS/system software by separating the IO into different virtual machines (VMs) from the enclaves. This does not, however, mitigate attacks from SMM on I/O. Embodiments discussed herein mitigates this threat by denying SMM access to the hardware an enclave would need for I/O. These and other details will become apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a device 100 in which aspects of the present disclosure may be employed. The device 100 may include a number of devices, systems, components, circuitry and infrastructure to provide a secure SMM. More specifically, the device 100 may include firmware 101, memory 105, I/O memory 113, one or more I/O devices 117 and circuitry, a computing processing unit (CPU) 120, one or more page tables 125 having any number of pages 127 and page table attributes 129. In embodiments, the memory 105 may further include a portion having regions that may be allocated with a system management random access memory (SMRAM) 107 which may be further installed with an SMI handler 115. The memory 105 may also include other regions or a second portion to store information and instructions for one or more of an operating system(s) (OS) and virtual machine manager(s) (VMM) in OS/VMM 111. Note some embodiments may only include an OS. In some embodiments, the device 100 may also include an I/O memory 113 or memory-mapped I/O to communicate with I/O devices 117. The CPU 120 may include registers 122 and processing circuitry 124. FIG. 1 illustrates device 100 having a limited number of features and embodiments are not limited in this manner.

In various embodiments, the device 100 may be embodied as any type of computing device, including a personal computing, a desktop computer, a tablet computer, a netbook computer, a notebook computer, a laptop computer, a server, server farm, blade server, or any other type of server, and so forth. In some embodiments, the device 100 may be a communication station, a mobile station, an advanced station, a client, a platform, a wireless communication device, a mobile computer, a set-top box, a handheld computer, a handheld device, a Personal Digital Assistant (PDA) device, a handheld PDA device, netbook, a mobile telephone, a smart phone, a mobile cellular telephone, and so forth. Embodiments are not limited in this manner.

In some embodiments, the device 100 may include one or more CPUs 120 which may include one or more cores to process information for the device 100. The CPU 120 may be one or more of any type of computational element, such as but not limited to, a microprocessor, a processor, central processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 120 may be connected to and communicate with the other elements of the computing system via a one or more interconnects, such as one or more buses, control lines, and data lines.

As previously mentioned, the CPU 120 may include a number of registers 122 including a lock register 122-1 that may be used by the device 100 to prevent malicious code and attacks using SMM code from modifying the page table attributes 129, other registers 122, memory 105, I/O memory 113, I/O devices 117 (I/O ports), SMM state saves, other memory map I/O (MMIO) resources, peripheral component express (PCIe) resources, and other model-specific registers (MSRs). More specifically, the lock register 122-1 may be used to lock or prevent modification of paging related registers, such as the page table registers 122-2, SMM related registers such as the SMM registers 122-3, SMM monitoring controls, and a bitmap register 122-4, which may be a bitmap address register.

The lock register 122-1 may be an MSR and may be written to via the write the model-specific register (WRMSR) instruction. In some embodiments, the WRMSR instruction to write to the lock register 122-1 may occur in response to the occurrence of an SMI entry point, before the SMI code branches or consumes data. Effectively, the WRMSR instruction to write to the lock register 122-1 may be straight-line code that causes the lock to be set on each SMI before any possible vulnerability could be exploited. In some embodiments, the lock register 122-1 may be updated by the CPU 120 in response to an SMI close instruction. Further and as an alternative to using the lock register 122-1 on each SMI entry point, the page table registers 122-2 and SMM registers 122-3 may be set and permanently locked within the SMM, but require an entry in the page table 125 with paging turned on. Note that in some embodiments, the entire lock register 122-1 may be set to lock down an associated paging table 125 and page table attributes 129. However, in the same or other embodiments, certain bits of the lock register 122-1 may be used to lock down an associated page table 125 and page table attributes 129. In some embodiments, one or more bits may each be associated with a different page table and page table attributes. Embodiments are not limited in this manner.

In embodiments, the lock register 122-1 may be the SMM_SUPOVER_STATE_LOCK MSR, IA32_SMM_SUPOVR_STATE_LOCK MSR, or other similarly named register to lock access. The lock register 122-1 may be used to lock the bitmap register 122-4 and bitmaps. The bitmap register 122-4 may be an MSR and may be used to manage the location of one or more bitmaps having bits to control access to I/O devices (I/O ports) and other MSRs (SMM save state registers). For example, the bitmap register 122-4 include the memory address to locate bitmaps associated with I/O Ports and MSRs. The bitmap register 122-4 may include a 16 kB alignment, e.g., indicate a location in the memory to locate the bitmaps having a 16 kB size or region. Moreover, a 16 kilobytes (kB) region of the memory is allocated for the one or more bitmaps. In one example, the 16 kB region may include four 1 kB bitmaps allocated for MSRs, two 4 kB bitmaps allocated for input/output (I/O) devices, and one 4 kB region reserved for future use, and/or additional MSRs, I/O devices, etc. The bitmaps may be utilized to enable/disable access controls to I/O devices 117 (I/O ports), I/O memory 113, SMM save state registers 122-5, and other CPU registers 122-6. For example, each one of the I/O devices 117, I/O memories 112, SMM save state registers 122-5, and other CPU registers 122-6 may be associated with one or more bits of the bitmaps. Access may be enabled or disabled based on the settings of the bits in the bitmaps located via the bitmap register 122-4. Once locked down, the SMI handler 115 effectively has deprivileged itself with regard to the access policy expressed in these controls, e.g., the bitmap register 122-4 and bitmaps. In other words, the SMI handler 115 cannot make changes to the bitmap register 122-4 and/or bitmaps once they are locked down.

In embodiments, the CPU 120 may also include a number of page table registers 122-2, such as a CR0 register 122-2-1, a CR3 register 122-2-2, a CR4 register 122-2-3, an EFER register 122-2-4, and one or more MISC ENABLE registers 122-2-5. These registers may control various aspects and settings of the page table 125 and pages 127. For example, the CR0 register 122-2-1 is a control register that may be used to modify basic operations of the CPU 120 associated with paging and other processing. In another example, the CR3 register 122-2-2 is used for virtual addressing and enables the CPU 120 to translate linear addresses into physical addresses by locating the page directory (not shown) and page table 125. The CR4 register 122-2-3 is used for protected mode to I/O breakpoints, page size extensions, and machine check extensions. The EFER register 122-2-4 is an MSR that is used to allow and enable system call and system return instructions. The EFER register 122-2-4 may be used to control execute-disable (XD) and whether the long mode is enabled for the page table 125.

The CPU 120 may also include SMM registers 122-3 such as the system management range register (SMRR) 122-3-1 to control caching for the CPU 120 in SMM and the SMBASE register 122-3-2 which may have a pointer to the beginning of the SMM state-save map, and stores the contents in a downward direction. Embodiments are not limited to these specific registers. The CPU 120 may also include other registers, such as the MSEG_BASE register, that may be related to SMM and may be locked via utilization of the lock register 122-1.

In embodiments, CPU 120 may include the SMM save state registers 122-5, which may be utilized to control access to SMM state saves. Typically, SMM state saves may be mapped to the SMRAM 107. However, mapping the SMM state saves to SMRAM 107 may enable the SMI handler 115 to access these SMM state saves. This context can be both read and written to by the SMI handler 115, for example. This allows the SMI handler 115 to directly change the execution of the interrupted context. Thus, in order to prevent OS isolation from the SMI handler 115, the SMM state saves must be controlled via the SMM state save registers 122-5. As mentioned, access to the SMM save state registers 122-5 may be enabled/disabled based on one or more bits set in the bitmaps associated with the bitmap register 122-4. The SMM state saves registers 122-5 may include one or more MSRs that expose SMM state saves to the SMI handler 115. Said differently, the CPU 120 may map the state saves of the SMM into internal CPU memory (not shown) and expose the state saves to the SMI handler via the SMM save state registers 122-5 instead of utilizing the SMRAM 107 to store the SMM state saves. Access to the SMM state saves in the CPU memory may be controlled via the lock register 122-1 and the bitmap register 122-4. For example, an MSR bitmap of the bitmaps associated with and located by the bitmap register 122-4 may be used to control access to the interrupt contexts in the SMM save state registers 122-5. Thus, the SMI handler 115 may only gain access to the interrupted context when permitted and determined by the lock register 122-1 and the bitmap register 122-4 and bitmaps.

The CPU 120 may also include other registers, such as CPU registers 122-6 that require access controls. Not all CPU registers are saved and restored via the SMM State Save mechanism. For example, CPU registers 122-6, such as floating point registers, MMX (single instruction, multiple data (SIMD) instruction set) registers, XMM SIMD instruction set) registers, and advanced vector extension (AVX) registers, and so forth simply retain their value through SMM. Without restricting access to these registers, the SMI handler 115 will have read/write access to the OS context of these registers. In order for these types of registers to be accessed, normally there are other bits in CPU control registers (e.g., CR0, CR4) that must be set. On SMM entry, these control bits are cleared so the SMI handler 115 would have to explicitly re-enable access. However, as discussed herein, the control registers are locked via the lock register 122-1, including one or more bits. For example, the lock register 122-1 may include the IA32_SMM_SUPOVR_STATE_LOCK.LPS (LockPagingState) bit to lock the control registers. Therefore, access control to CPU registers not explicitly controlled via the SMM state save mechanism can be accomplished by locking the control register configuration such that SMM cannot access these additional registers.

The CPU 120 may also include processing circuitry 124 to process information and instructions for the device 100. The processing circuitry 124 may be circuitry that carries out the instructions of a computer program by performing the basic arithmetic, logical, control and input/output (I/O) operations specified by the instructions. For example, the processing circuitry 124 can include an arithmetic logic unit (ALU) that performs arithmetic and logic operations. In some instances, the registers 122 may supply operands to the ALU and store the results of ALU operations. The processing circuitry 124 may also include a control unit that fetches instructions from memory and "executes" them by directing the coordinated operations of the ALU, registers 122 and other components. Embodiments are not limited in this manner, and the above-description only provides a high-level overview of processing by the processing circuitry 124 for the CPU 120.

The device 100 also includes memory 105 which may be any type of memory capable having one or more regions or portions to store information and data. In some embodiments, the memory 105 may include a first portion allocated as the SMRAM 107 to store information and instructions used with the SMM. In some embodiments, the SMRAM 107 may be referenced as SMM memory. Further, the SMRAM 107 may be a special portion of the memory 105 that is only accessible while the CPU 120 is operating in the SMM and to the SMM code. In some embodiments, the SMRAM 107 may be have the ability to be relocated within the memory 105 and locatable by the pointer in the SMBASE register 122-3-2. Thus, embodiments may include locking access to the SMBASE register 122-3-2 to secure the system while operating in the SMM.

Further, the SMRAM 107 may include an SMI handler 115 installed by the firmware 101 to handle SMIs to cause the device 100 to enter the SMM. The SMIs offer extended functionality, such as legacy hardware device emulation and system management tasks. As will be discussed in more detail below, the firmware 101 may be part of the basic input/output system (BIOS) or unified extensible firmware interface (UEFI) used to perform hardware initialization and performing the booting sequence. The SMI handler 115 may be inserted in the SMRAM 107 during an initialization phase of the device 100. For example, the SMI handler 115 may be installed during the power-on-self-test sequence (POST) at a checkpoint and may be functional thereafter. Once the SMI handler 115 is installed and configured in the SMRAM 107, the SMI handler 115 may be locked, via a setting a register, to provide a more secure SMM environment.

The memory 105 may also include a second region allocated to the OS/VMM 111, which may be used by the OS and/or VMMs. For example, the memory 105 may store data momentarily, temporarily, or permanently for an OS, such as Windows®, Apple OS®, Linux®, UNIX®, VMMs, and so forth. Moreover, the memory 105 may store instructions and data for operating the device 100 and an OS. The memory 105 may also store temporary variables or other intermediate information while the CPU 120 is executing instructions for the OS. Embodiments are not limited in this manner.

The memory 105 may be one or more of random access memory (RAM), read-only memory (ROM), electrically erasable programmable read-only memory (EEPROM), flash memory, and so forth. The memory 105 is not limited to these memory components. For example, the memory 105 may include a non-transitory computer-readable storage medium.

In some embodiments, the device 100 may include input/output (I/O) memory 113 which may be mapped to enable peripheral devices to communicate and operate with the device 100 and CPU 120. In some instances, the mapped I/O memory 113 may be part of memory 105 and other instances mapped I/O memory 113 may utilize different, dedicated memory for I/O devices. In some embodiments, the mapped I/O memory 113 utilizes memory mapped I/O (MMIO) operations and/or port-mapped I/O (PMIO) operations to perform I/O between the CPU 120 and peripheral devices, e.g., I/O devices 117. MMIO uses the same address bus to address both memory 113, and I/O devices 117—the memory 113 and registers of the I/O devices 117 are mapped to address values. Thus, when an address is accessed by the CPU 120, it may refer to a portion of physical memory, but it can also refer to memory 113 of the I/O device. Thus, the CPU instructions used to access the memory 113 can also be used for accessing devices 117. Each I/O device 117 monitors the CPU's 120 address bus and responds to any CPU 120 access of an address assigned to that device, connecting the data bus to the desired device's hardware register. Embodiments are not limited in this manner.

In embodiments, the device 100 also includes at least one page table 125 having a number of pages 127. In the illustrated embodiment, the page table 125 may be an SMM page table that may be utilized by the CPU 120 during SMM. Although not illustrated as part of the memory 105, the page table 125 may be a data structure stored in the memory 105 that is used by the virtual memory system to store mappings between virtual addresses and physical addresses of the memory 105. In some embodiments, the pages 127 may include mapped code pages and mapped data pages. However, embodiments are not limited in this manner, and the pages may store other types of data and information. In operation, the CPU 120 may include a memory management unit (MMU) (not shown) that may utilize the page table 125 to locate information via a physical address of the memory 105. In embodiments, a page table lookup may fail if a page is not resident in the physical memory, a translation cannot be performed, a requesting process does not have permission to access the information, and so forth.

As mentioned, the page table 125 may be an SMM page table and page protections may be applied to the page table 125 and pages 127 to prevent attacks. More specifically, one or more page table attributes 129 may be configured for the page table 125 to limit access via setting permissions for the pages 127 including the mapped code pages and the mapped data pages. As will be discussed in more detail below, the page table 125 and appropriate page table attributes 129 may be generated and set during the configuration of the SMI handler 115, early in the initialization phase of the device 100 and prior to the SMI handler 115 being locked down.

The page table attributes 129 may include settings for one or more of the pages 127 of the page table 125 including the mapped code pages and the mapped data (non-code) pages. These settings in the page table attributes 129 may include permissions to write, read, and/or execute information and data in the pages 127. In some embodiments, a combination of permissions may be set for one or more pages 127 in the page table 125. The page table attributes 129 may ensure the pages 127 are protected and to prevent malicious attacks, such as a code injection attack. For example, all mapped code pages may be designated as read-only and execute such that any attempt to overwrite a code page will cause a page fault. In another example, all mapped data pages may be designated as execution disable (eXecutionDisable) such that any attempt to execute a data page will cause a page fault. In a third example, one or more of the mapped data pages may be designated as read and write (ReadWrite), while others may be designated as read-only (ReadOnly). More specifically, data pages that map the page table 125 itself include critical data such as global descriptors and interrupt descriptors, and additional data such as information in the system management system table (SMST) data and SMM data. The SMM data may include structures such as the protocol database, S3 resume, script, and so forth. Thus, any attempt to write to a page set as read-only will cause a page fault. Embodiments are not limited in this manner and, in some instances, any page 127 that does not need to be written to at the runtime may be set as read-only.

In some instances, data in particular pages 127 may need to be accessed and written to during runtime. Thus, these pages 127 may be designated read and write and may include the program stack, dynamic global data, and the SMM state save area. Further and to ensure an optimal configuration and permission settings for the pages 127, embodiments may include the firmware 101 to cause data that requires read and write permissions to not reside on the same page as data that can be configured as read-only. In other words, the firmware 101, which may be part of the BIOS instructions, may configure the page table 125 and pages 127 such that data requiring read and write permissions does not reside on a same page as data requiring read-only permissions. Embodiments are not limited in this manner. The firmware 101 may perform a relocation operation to move read-only data to pages with other read-only data and move read and write data to pages with other read and write data, for example.

In some case, one or more pages 127 may be omitted from the page table 129. These pages 127 may be located in the OS/VMM 111 region. Omitting these pages 127 from the page table 125 will render benign many otherwise potentially exploitable bugs that could result in a "confused deputy" privilege escalation attack from the SMI handler 115.

As mentioned, the device 100 may also include the firmware 101 to configure various aspects of embodiments described herein. In some embodiments, the firmware 101 may be a set of instructions programmed or hardcoded into read-only memory that saves and holds information even when power is not being applied. The firmware 101 may at least partially be implemented as part of the system BIOS that is used to initiate the device 100 and various hardware components of the device 100, such as the CPU 120 and the memory 105.

The firmware 101 may be utilized to allocate the memory 105 for the SMRAM 107, initialize and install the SMI handler 115, and set the page table attributes 129. In some embodiments, the firmware 101 may set the page table attributes 129 during the initialization and installation of the SMI handler 115 prior to the SMI handler 115 being locked down. For example, power may be applied to the device 100 causing one or instructions to be fetched from flash memory and processed to begin a boot sequence of the device 100. As part of the initialization, various hardware components may be initialized and configured based on information in the firmware 101. For example, the CPU 120 may be configured and put into an initial state; the memory 105 may be initialized, other components and controllers may be initialized including I/O controllers, one or more storage devices, and so forth. The initialization process may continue and include installing the SMI handler 115 in the SMRAM 107, generating a page table 125 and pages 127 for the SMRAM 107 and generating page table attributes 129 for the page table 125.

In some instances, the firmware 101 may include one or more instructions that may be processed by circuitry, such as processing circuitry 124, to cause the allocation of regions of memory 105 for use by the device 100. One particular region may be the SMRAM 107 which may be used by the CPU 120 during processing in the SMM. During the allocation of the SMRAM 107, the SMI handler 115 code and SMM data to handle SMIs may be installed in the SMRAM 107. Typically, once the SMI handler 115 is installed into the SMRAM 107, the SMI handler 115 is locked away and cannot be accessed by non-SMM code. Further, while it is possible for the SMI handler 115 to modify itself, once the initial configuration is complete and locked away the SMI handler 115 is static and cannot be modified. Thus, firmware 101 may also include one or more instructions to prohibit the SMI handler 115 from modifying itself, even during the initialization stage. Any exploitable vulnerabilities in the SMI handler 115 will also not have the ability to modify the SMI handler 115 itself adding another layer of protection from attack.

The firmware 101 may also include one or more instructions to generate the page table 125 and pages 127 for the SMRAM 107 and for use while the CPU 120 is in the SMM. In some instances, the page table 125 and pages 127 may be generated during the dynamic phase of the SMI handler 115 installations before the SMI handler 115 is locked down and put into a static state. As part of the generation of the page table 125 and the pages 127, the instructions may apply the appropriate page protections and permissions to the page table 125 and pages 127 by setting one or more page table attributes 129. More specifically, the instructions may include setting one or more page table attributes 129 to specify read, write, and/or execution permissions for the page table 125 and pages 127. These page table attributes 129 may be set in a secure manner and may not be modified during processing while the CPU 120 is in the SMM.

The firmware 101 may include instructions to write to the lock register 122-1, bitmap register 122-4, and bitmaps during the boot process to prevent malicious code and attacks using SMM code from modifying the page table attributes 129, I/O ports, MSRs, SMM state saves, and other CPU registers 122-6. More specifically, the lock register 122-1 may be used to lock or prevent modification of the paging related registers, such as the page table registers 122-2, the SMM related registers such as the SMM registers 122-3, and the bitmap register 122-4 as previously discussed. For example, the lock register 122-1 may be written to during the initiation of the SMM to ensure that the one or more page table attributes 129 configured during the initialization stage and installation of the SMI handler 115 are not overwritten or changed during operation in SMM. Similarly, the bitmap register 122-4 (and bitmaps) may be set via one or more WRMSR instructions, and the lock register 122-1 may be written to via WRMSR instructions to lock down the bitmap register 122-4 and bitmaps. The bitmap register 122-4 may only be written to from SMM; a general protection fault may occur if RDMSR/WRMSR is attempted outside of SMM.

Figure 2:
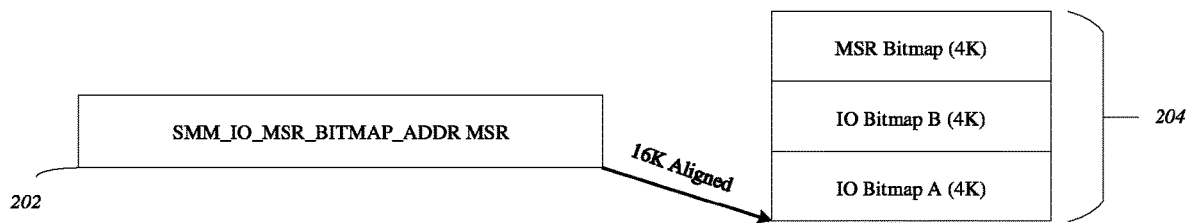
FIG. 2 illustrates an example of a bitmap mechanism.

FIG. 2 illustrates an example of a bitmap mechanism 200, which may including a bitmap register 202 and one or more bitmaps 204. The one or more bitmaps 204 may be access control bitmaps that may be utilized to control access to I/O ports and MSRs. For example, the one or more bitmaps 204 may specify whether an instruction can read/write information to an MSR, access (send/receive) information via an I/O port, etc. The bitmap register 202, which may be similar to or the same as bitmap register 122-4 discussed with respect to FIG. 1. The bitmap register 202 may be a new MSR and used to manage the location of the bitmaps 204. In some embodiments, the bitmaps 204 may be similar to one or more bitmaps utilized in Intel® Virtualization Technology® (VT) including STM®. However, in embodiments discussed herein, the bitmap mechanism 200 may utilize the new MSR, bitmap register 202 (SMM_IO_BITMAP_ADDR MSR), and access controlled may be determined and controlled by a lock register, such as lock register 122-1, e.g. SMM_SUPOVR_STATE_LOCK MSR. For example, a bit in the SMM_SUPOVR_STATE_LOCK MSR must be set in order to enable access control checks to occur in the bitmaps 204. In embodiments, the bitmap mechanism 200 including the bitmap register 202 and bitmaps 204 may be utilized to enable/disable access controls to I/O devices 117 (I/O ports), I/O memory 113, SMM save state registers 122-5, and other CPU registers 122-6, as discussed. For example, each one of the I/O devices 117, I/O memories 112, SMM save state registers 122-5, and other CPU registers 122-6 may be associated with one or more bits of the bitmaps. Access may be enabled or disabled based on the settings of the bits in the bitmaps. The bitmap register 202 (122-4) may be utilized to lock down the bitmaps 204. Once locked down, the SMI handler 115 effectively has deprivileged itself with regard to the access policy expressed in these controls, e.g., the bitmap register 202. In other words, the SMI handler 115 cannot make changes to the bitmap register 202 and/or bitmaps 204 once it is locked down.

The bitmap register 202 may be 16K aligned, these bits 13:0 must be set to 0, or a general protection fault may occur. The bits of the bitmap register 202 may not be set beyond the physical address width of the CPU, or a general protection fault may occur. The bitmap register 202 may be hardware thread-scoped and read and writing (RDMSR/WRMSR) to the bitmap register 202 may only occur from SMM, as previously mentioned. As discussed in more detail in FIG. 3, one or more bits of a lock register, such as lock register 122-1 (SMM_SUPOVR_STATE_LOCK) may be used to lock/control access to the bitmap register 202. In embodiments, the bitmap register may indicate a location of a 16 kilobytes (kB) region of memory that is allocated for the one or more bitmaps. In one example, the 16 kB region includes four 1 kB bitmaps allocated for MSRs, two 4 kB bitmaps allocated for input/output (I/O) devices, and one 4 kB region for future use.

In some embodiments and as previously discussed one or more of the bitmaps 204 may be associated with and control access to MSR registers for SMM state saves, such as SMM state save registers 122-5. As mentioned, the CPU 120 may include the SMM save state registers 122-5, which may be utilized to control access to SMM state saves. Thus, access to the SMM save state registers 122-5 may be enabled/disabled based on one or more bits set in the bitmaps, such as the "MSR Bitmap," located with the bitmap register 122-4. The SMM state save registers 122-5 may include one or more MSRs that expose SMM state saves to the SMI handler 115. Said differently, the CPU 120 may map the state saves of the SMM into internal CPU memory (not shown) and expose the state saves to the SMI handler via the SMM save state registers 122-5 instead of utilizing the SMRAM 107 to store the SMM state saves. Access to the SMM state saves in the CPU memory may be controlled via the lock register 122-1 and the bitmap register 122-4. Thus, the SMI handler 115 may only gain access to the interrupted context when permitted and determined by the lock register 122-1 and the bitmap register 122-4 and bitmaps. Embodiments are not limited by this example, and other MSRs and I/O ports may be controlled via the bitmaps 204.

Figure 3:
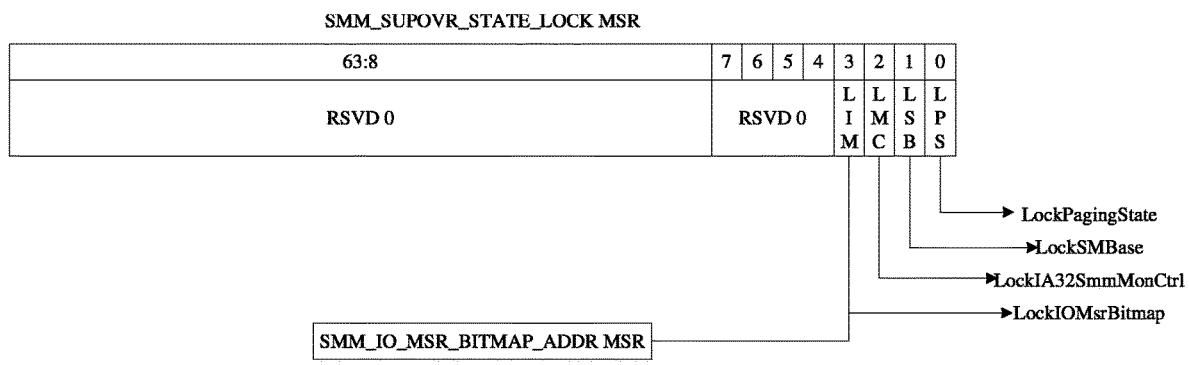
FIG. 3 illustrates an example of a register.

FIG. 3 illustrates an example of a lock register 300, which may be similar to or the same as lock registers 122-1 discussed with regards to FIG. 1. In the illustrated example, the lock register 300 may be new MSR, such as a SMM_SUPOVR_STATE_LOCK MSR, any other named MSR to utilized to perform the functionality discussed herein. The lock register 300 may include a number of reserve bits (RSVD 0), such as bits 63:4. Other bits may be utilized control access to elements of a device, such as memory (page tables), I/O ports, MSRs, and so forth. For example, one bit may be utilized to lock a paging state, e.g., (LockPagingState) bit. The LockPagingState (LPS) may provide access control to CPU registers not explicitly controlled via the SMM state save mechanism. For example, CPU registers 122-6, such as floating point registers, MMX (single instruction, multiple data (SIMD) instruction set) registers, XMM SIMD instruction set) registers, and advanced vector extension (AVX) registers, and so forth simply retain their value through SMM. These registers may be locked via the LPS bit, which may be bit 0 in the lock register 300. In some embodiments, the LPS bit may also be utilized to lock or control access to the page table registers 122-2. Embodiments are not limited in this manner.

In embodiments, the lock register 300 may also include a bit to control access to registers related to the SMM, such as SMM registers 122-3. For example, a bit, such as LockSMBase bit, may be used to control access to the SMBASE register and the MSEG_BASE register. Embodiments are not limited in this manner and other SMM related registers may be controlled via the LockSMBase bit. The lock register 300 may also include a bit, such as LockIA32SmmMonCtrl, to control access to SMM monitoring controls.

The lock register 300 may include a bit to control access to a bitmap register, such as bitmap register 122-4 and bitmap register 200, as previously discussed. In embodiments, the bit may be named "LockIOMsrBitmap" or the like. Embodiments are not limited to this name. The bit may be used to control access to the bitmap register and associated bitmaps. As previously discussed in FIG. 2, the bitmap register 202 and bitmaps 204 may only be accessed and control checks may be done if the bit (LockIOMsrBitmap) is set of the lock register. Embodiments are not limited in this manner.

Figure 4:
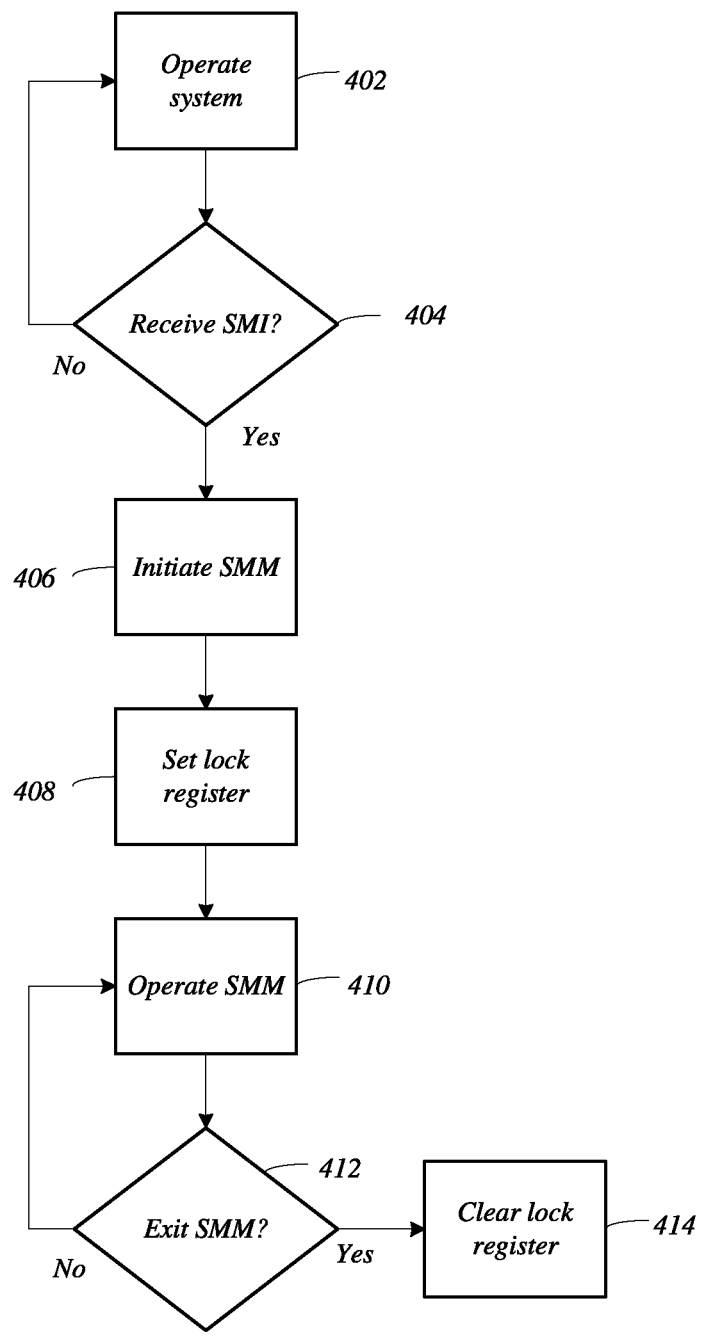
FIG. 4 illustrates an example of a first logic flow.

FIG. 4 illustrates an example embodiment of a first logic flow 400. The logic flow 400 may be representative of some or all of the operations executed by one or more embodiments described herein. Further, the logic flow 400 may perform by circuitry, such as processing circuitry 124. Moreover, logic flow 400 may be performed in conjunction with one or more other logic flows discussed herein.

The logic flow 400 may be one example processing flow to operate the device 100 and CPU 120 in SMM while locking down various MSRs, I/O ports, SMM State Save, page table attributes, CPU registers, and so forth, to prevent malicious code attacks. At block 402, the logic flow 400 may include operating the device 100 in a "normal" mode of operation or not the SMM. The device 100 may continue to operate in this manner until it is turned off or an SMI is received at decision block 404. The SMI may be received via a signal on a pin of the CPU 120, or as an instruction via a bus coupled with the CPU 120. SMIs are typically the highest priority interrupts. In some instances, the SMI may be generated in response to a software instruction, usually a write to an I/O port such as 0xb2 (the SMI Command Port).

In some embodiment, one or more instructions may a write a value (the SMI Command Value) to an SMI Command Port. Typically processing circuitry detects the write to the SMI Command Port and asserts the SMI# pin on the CPU 120 or sends an SMI message to the CPU 120. Generally, the CPU 120 detects the SMI after the current instruction has been completed. The CPU 120 may save state information for one or more of the registers 122 in a buffer and initializes or switches to SMM at block 406 and jumps to a pre-defined entry point.

At block 408, the CPU 120 may set one or more bits of the lock register 122-1 to prevent the SMM from make modifications to the page table attributes, SMBASE register, the MSEG_BASE register, SMM monitoring controls, MSRs, I/O ports, and/or an SMM State Save. In embodiments, a WRMSR instruction may be utilized to set the one or more bits of the lock register 122-1. For example, the "LockIOMsrBitmap" bit may be set by utilization of the WRMSR instruction. When the LockIOMsrBitmap bit is set, the CPU 120 may disallow writes to the SMM_IO_MSR_BITMAP_ADDR MSR and enable the IO and MSR bitmaps such that IO and MSR access attempts that violate the specified policy will result in a fault. The SMM_IO_MSR_BITMAP_ADDR MSR may also be utilized to secure the SMM State Save that contains the CPU context that was interrupted by the SMI. Typically, the SMI handler can read/write to this context, and this allows the SMI handler to directly change the execution of the interrupted context. In order to provide OS isolation from the SMI handler, the SMM State Save may be mapped into internal CPU SRAM memory and is exposed to the SMI handler via a bank of MSRs where access is controlled by the SMM_IO_MSR_BITMAP_ADDR MSR.

In embodiments, the lock register 122-1 may be written to on each SMI close to the pre-defined entry point. Note that a lock may occur for each SMI by writing to a MSR associated with each SMI and they may be individually controllable or aggregated together. Embodiments are not limited in this manner.

The logic flow 400 may include operating in the SMM at block 410 and determine whether to exit the SMM at decision block 412. The CPU 120 may exit the SMM when a resume from system management mode (RSM) instruction is received by the CPU 120. The RSM instruction returns program control from SMM to the application program or operating-system procedure that was interrupted when the CPU 120 received an SMI. The CPU's 120 state is restored from a dump created upon entering SMM. If the CPU 120 detects invalid state information during state restoration, it enters the shutdown state. Further and at block 414, the lock register 122-1 may be cleared upon reception of the RSM instruction and exiting the SMM.

Figure 5:
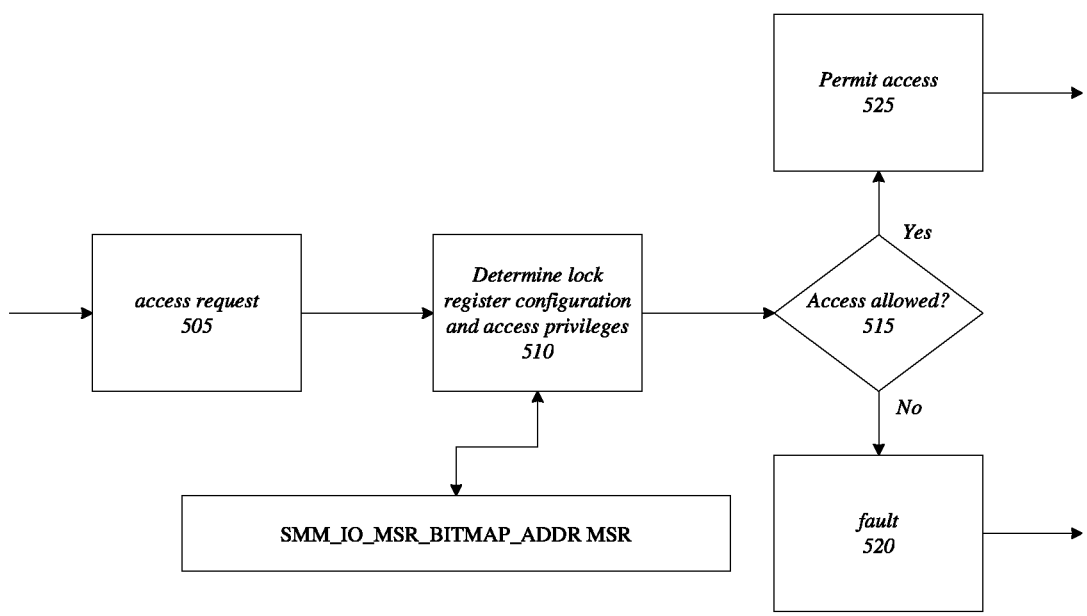
FIG. 5 illustrates an example of a first processing flow.

FIG. 5 illustrates an example of a first processing flow 500 to process a access request, such as an access request to an MSR or I/O port that is configured in a bitmap controlled/identified by a bitmap register, e.g. SMM_IO_MSR_BITMAP_ADDR MSR 202 and corresponding bitmaps 204. In embodiments, the access request may be for the SMM State Save controlled by a MSR bitmap, another MSR register controlled by a MSR bitmap, an I/O port controlled by an I/O bitmap, another CPU register controlled by an MSR bitmap, and so forth. The processing flow 500 may be representative of some or all of the operations executed by one or more embodiments described herein. For example, the processing flow 500 may illustrate operations performed by device 100, and in particular, processing circuitry 124 while the CPU 120 is operating in the SMM.

In the illustrated embodiment shown in FIG. 5, the processing flow 500 may include receiving the access request 505 from an instruction while the device 100 and CPU 120 are operating in SMM. The access request may include instructions/addresses/information to access information, data, code, etc. stored in registers and/or I/O ports. In embodiments, the processing flow 500 may determine lock register configuration and access privileges at block 510. For example, the CPU 120 may determine whether a bit associated with the bitmap register is set or not set, e.g., whether LockIOMsrBitmap of SMM_SUPOVR_STATE_LOCK MSR is set. If the bit is set, the CPU 120 will disallow writes to SMM_IO_MSR_BITMAP_ADDR MSR and enable the IO and MSR bitmaps such that IO and/or MSR accesses will operate in accordance with their expressed policies, e.g., bitmap settings in the bitmaps.

Further and at block 515, the processing flow 500 may include making a determination as to whether the requesting instruction has the appropriate permissions to access the data, code, information, etc. based on the configuration a bitmap. If the requesting instruction does not have permission to perform the access request, the processing flow 500 may return fault at block 520. However, if the requesting instruction does have the appropriate permissions to access the data, code, information, etc, the logic flow 500 may return the data or perform the action based on the access instruction at block 525. Embodiments are not limited to this example.

FIG. 6 illustrates an example of a second processing flow 600 to control access to computing resources in SMM. The processing flow 600 may be representative of some or all of the operations executed by one or more embodiments described herein. For example, the processing flow 600 may illustrate operations performed by device 100, and in particular, CPU 120 and processing circuitry 124.

At block 605, the logic flow 600 includes detecting an access request to access a computing resource while in a system management mode (SMM). The access request may be request to perform one or more instructions on the computing resource, such as performing a write, a read, an execution, and so forth. Embodiments are not limited in this manner and other types of access requests may be made based on the computing resource. The computing resource may include a one or more registers, such as MSRs, CPU registers, and so forth. In one example, the computing resource includes one or more registers storing the SMM State Save. Other computing resources may include I/O devices (I/O ports) and associated I/O memory. These I/O devices include parallel ports, serial ports, USB ports, Firewire ports, and so forth. In some embodiments, the I/O device may be a transceiver to communicate wireless with other devices. Embodiments are not limited in this manner.

At block 610, the logic flow 600 includes determining a bit of a lock register is set to enable access to a bitmap associated with the computing resource, the bitmap to indicate an access policy for the computing resource. In embodiments, the bit may be set when a value in the bit field equals one '1'. However, embodiments are not limited in this manner and other instances, the bit may be set when a bit field equals zero '0'. The lock register may be a MSR ("SMM_SUPOVR_STATE_LOCK"), and the bit field may be the "LockIOMsrBitmap" field, as previously discussed.

In some embodiments, the bitmap may be located via another MSR including the location and/or offset that may be used by the processing circuitry to determine the location of the bitmap. In one example, the MSR may be the "SMM_IO_MSR_BITMAP_ADDR" MSR, and the bitmap may be 16 kilobytes (KB) aligned. The bitmaps may be 1 kB in size, 4 kB in size, and so forth. However, embodiments are not limited into these examples.

In embodiments, the logic flow 600 includes determining whether the access request violate the access policy set or access settings in the bitmap at block 615. For example, the bitmap may specify access privileges, such as an immutable setting (device can/cannot be changed), a write setting (can/cannot write to the device), a read-only setting (can only read the device), an executable setting (can execute contents of the device), and an executable disabled setting (cannot execute contents of the device), etc. Embodiments are not limited in this manner. Further and at blocks 620 and 625, the logic flow 600 includes perform the access request if the access request does not violate the access policy, and cause a fault if the access request does violate the access policy, respectively. The fault may include causing an exception, exiting SMM, providing an error indication, and so forth.

Figure 7:
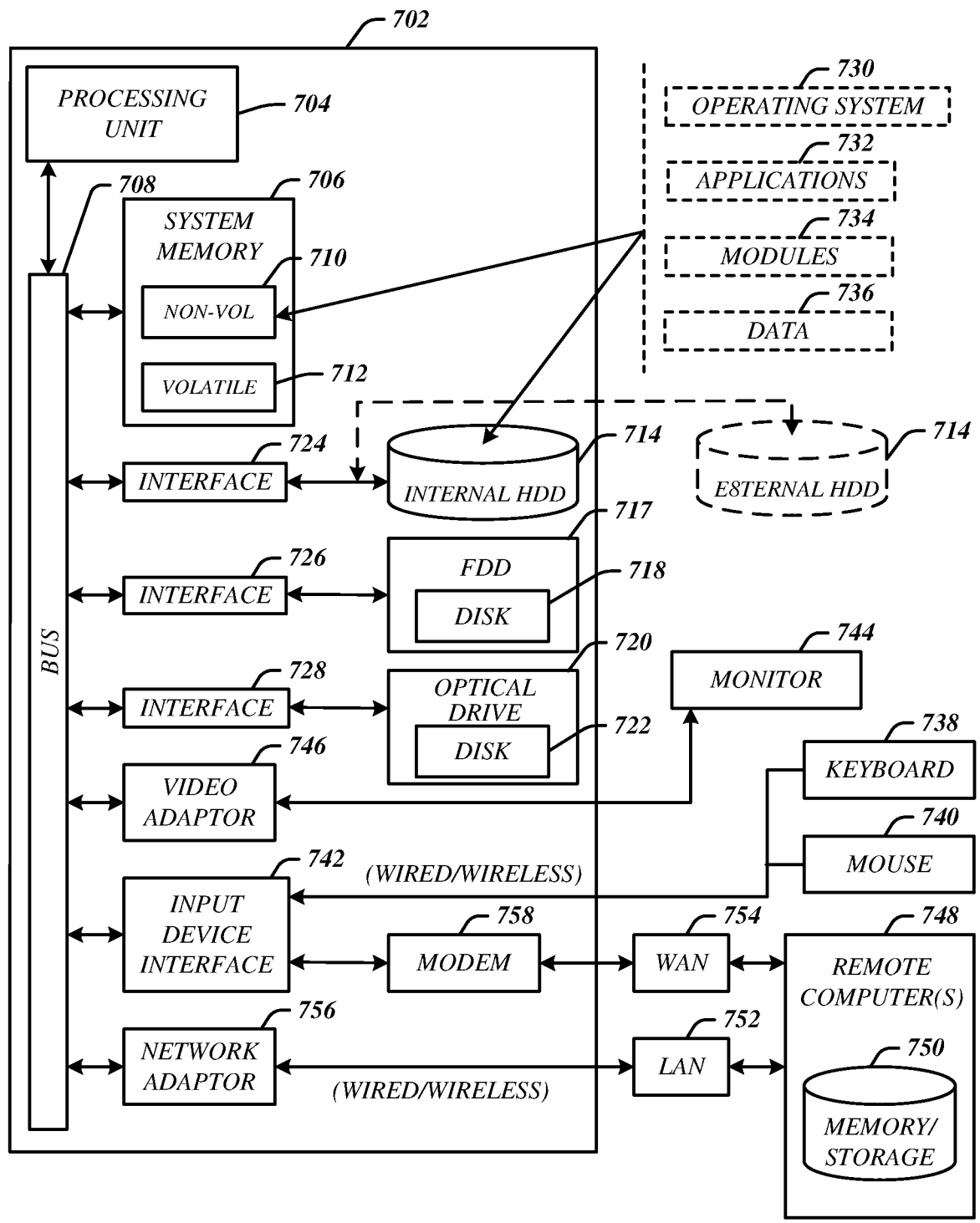
FIG. 7 illustrates an example embodiment of a computing architecture.

FIG. 7 illustrates an embodiment of an exemplary computing architecture 700 suitable for implementing various embodiments as previously described. In one embodiment, the computing architecture 700 may include or be implemented as part of device 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 707 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 738. In one embodiment, the one or more application programs 732, other program modules 734, and program data 738 can include, for example, the various applications and/or components of the device 100 and/or device 705.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 748. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 744 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 758. The adaptor 758 can facilitate wire and/or wireless communications to the LAN 752, which may also include a wireless access point disposed thereon for communicating with the wireless functionality of the adaptor 758.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the device 100 as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
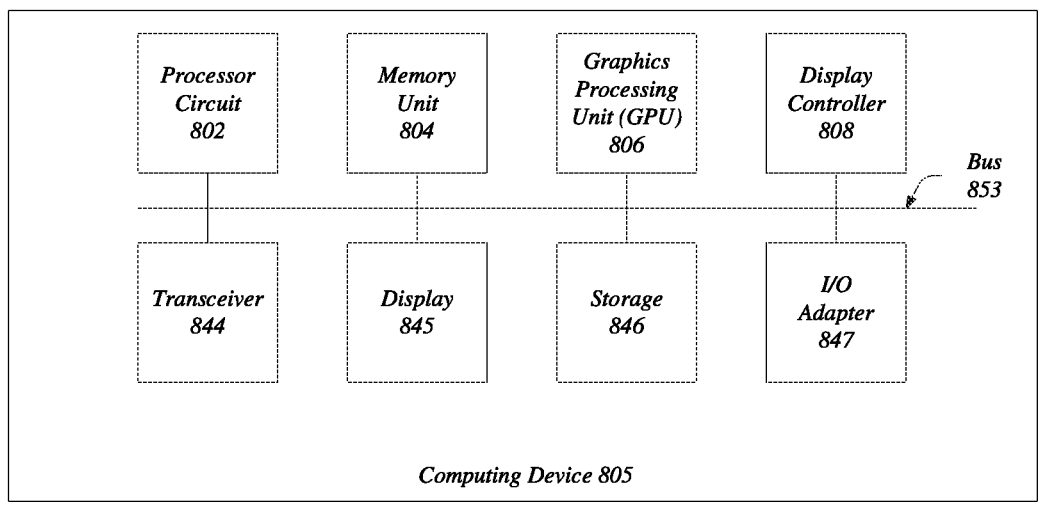
FIG. 8 illustrates an exemplary embodiment of a device.

FIG. 8 illustrates one embodiment of a system 800. In various embodiments, system 800 may be representative of a system or architecture suitable for use with one or more embodiments described herein, such as device 100, computing system 700, and device 800.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a computing device 805 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 805 may include processor circuit 802. Processor circuit 802 may be implemented using any processor or logic device. The processing circuit 802 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 802 may be connected to and communicate with the other elements of the computing system via an interconnect 843, such as one or more buses, control lines, and data lines.

In one embodiment, computing device 805 may include a memory unit 804 to couple to processor circuit 802. Memory unit 804 may be coupled to processor circuit 802 via communications bus 853, or by a dedicated communications bus between processor circuit 802 and memory unit 804, as desired for a given implementation. Memory unit 804 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 805 may include a graphics processing unit (GPU) 806, in various embodiments. The GPU 806 may include any processing unit, logic or circuitry optimized to perform graphics-related operations as well as the video decoder engines and the frame correlation engines. The GPU 806 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 806 may process any type of graphics data such as pictures, videos, programs, animation, 3D, 2D, objects images and so forth.

In some embodiments, computing device 805 may include a display controller 808. Display controller 808 may be any type of processor, controller, circuit, logic, and so forth for processing graphics information and displaying the graphics information. The display controller 808 may receive or retrieve graphics information from one or more buffers. After processing the information, the display controller 808 may send the graphics information to a display.

In various embodiments, system 800 may include a transceiver 844. Transceiver 844 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 844 may operate in accordance with one or more applicable standards in any version. The embodiments are not limited in this context.

In various embodiments, computing device 805 may include a display 845. Display 845 may constitute any display device capable of displaying information received from processor circuit 802, graphics processing unit 806 and display controller 808.

In various embodiments, computing device 805 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 805 may include one or more I/O adapters 847. Examples of I/O adapters 847 may include Universal Serial Bus (USB) ports/adapters, IEEE 1354 Firewire ports/adapters, and so forth. The embodiments are not limited in this context.

The detailed disclosure now turns to providing examples that pertain to further embodiments. Examples one through twenty-five provided below are intended to be exemplary and non-limiting.

In a first example, a system, a device, an apparatus, and so forth may include memory to store instructions, and processing circuitry coupled with the memory, the processing circuitry to detect an access request to access a computing resource while in a system management mode (SMM), determine a bit of a lock register is set to enable access to a bitmap associated with the computing resource, the bitmap to indicate an access policy for the computing resource, determine whether the access request violate the access policy set in the bitmap, perform the access request if the access request does not violate the access policy, and cause a fault if the access request does violate the access policy.

In a second example and in furtherance of the first example, the system, the device, the apparatus, and so forth including processing circuitry to process the access policy to specify one or more access settings for the computing resource, the one or more access settings comprising an immutable setting, a write setting, a read-only setting, an executable setting, and an executable disabled setting In a third example and in furtherance of any previous example, the system, the device, the apparatus, and so forth including processing circuitry to determine the bit of the lock register is not set to enable access to the bitmap and cause a fault to indicate an error.

In a fourth example and in furtherance of any previous example, the system, the device, the apparatus, and so forth including processing circuitry to determine a location of the bitmap in the memory based on a location indicated in a model specific register (MSR) associated with one or more bitmaps including the bitmap.

In a fifth example and in furtherance of any previous example, the system, the device, the apparatus, and so forth including processing circuitry to process a 16 kilobytes (kB) region of the memory is allocated for the one or more bitmaps, the 16 kB region comprising four 1 kB bitmaps allocated for MSRs, and two 4 kB bitmaps allocated for input/output (I/O) devices.

In a sixth example and in furtherance of any previous example, the system, the device, the apparatus, and so forth including processing circuitry to disable write operations to a bitmap register associated with the bitmap based on the bit of the lock register being set.

In a seventh example and in furtherance of any previous example, the system, the device, the apparatus, and so forth including processing circuitry to detect a system management interrupt (SMI), save a SMM save state in one or more model specific registers in response to the SMI, and set the bit of the lock register.

In an eighth example and in furtherance of any previous example, the system, the device, the apparatus, and so forth including one or more computing resources including the computing resource, wherein the one or more computing resources comprising Input/Output (I/O) devices, model specific registers (MSRs), and central processing unit (CPU) registers.

In a ninth example and in furtherance of any previous example, the system, the device, the apparatus, and so forth including a storage coupled with the memory and the processing circuitry, the storage to store data, and one or more input/output (I/O) devices coupled with the storage, the memory, and the processing circuitry, the one or more I/O devices configured to couple with one or more devices.

In a tenth example and in furtherance of any previous example, a computer-implemented method including detecting an access request to access a computing resource while in a system management mode (SMM), determining a bit of a lock register is set to enable access to a bitmap associated with the computing resource, the bitmap to indicate an access policy for the computing resource, determining whether the access request violate the access policy set in the bitmap, performing the access request if the access request does not violate the access policy, and causing a fault if the access request does violate the access policy.

In an eleventh example and in furtherance of any previous example, a computer-implemented method including processing the access policy to specify one or more access settings for the computing resource, the one or more access settings comprising an immutable setting, a write setting, a read-only setting, an executable setting, and an executable disabled setting.

In a twelfth example and in furtherance of any previous example, a computer-implemented method including determining the bit of the lock register is not set to enable access to the bitmap and cause a fault to indicate an error.

In a thirteenth example and in furtherance of any previous example, a computer-implemented method including determining a location of the bitmap in the memory based on a location indicated in a model specific register (MSR) associated with one or more bitmaps including the bitmap.

In a fourteenth example and in furtherance of any previous example, a computer-implemented method including a 16 kilobytes (kB) region of the memory is allocated for the one or more bitmaps, the 16 kB region comprising four 1 kB bitmaps allocated for MSRs, and two 4 kB bitmaps allocated for input/output (I/O) ports.

In a fifteenth example and in furtherance of any previous example, a computer-implemented method including disabling write operations to a bitmap register associated with the bitmap based on the bit of the lock register being set.

In a sixteenth example and in furtherance of any previous example, a computer-implemented method including detecting a system management interrupt (SMI), save a SMM save state in one or more model specific registers in response to the SMI, and set the bit of the lock register.

In a seventeenth example and in furtherance of any previous example, a computer-implemented method including one or more computing resources including the computing resource comprising Input/Output (I/O) devices, model specific registers (MSRs), and central processing unit (CPU) registers.

In an eighteenth example and in furtherance of any previous example, a computer-readable storage medium, comprising a plurality of instructions, that when executed, enable processing circuitry to detect an access request to access a computing resource while in a system management mode (SMM), determine a bit of a lock register is set to enable access to a bitmap associated with the computing resource, the bitmap to indicate an access policy for the computing resource, determine whether the access request violate the access policy set in the bitmap, perform the access request if the access request does not violate the access policy, and cause a fault if the access request does violate the access policy.

In a nineteenth example and in furtherance of any previous example, a computer-readable storage medium, comprising a plurality of instructions, that when executed, enable processing circuitry to process the access policy to specify one or more access settings for the computing resource, the one or more access settings comprising an immutable setting, a write setting, a read-only setting, an executable setting, and an executable disabled setting.

In a twentieth example and in furtherance of any previous example, a computer-readable storage medium, comprising a plurality of instructions, that when executed, enable processing circuitry to determine the bit of the lock register is not set to enable access to the bitmap and cause a fault to indicate an error.

In a twenty-first example and in furtherance of any previous example, a computer-readable storage medium, comprising a plurality of instructions, that when executed, enable processing circuitry to determine a location of the bitmap in the memory based on a location indicated in a model specific register (MSR) associated with one or more bitmaps including the bitmap.

In a twenty-second example and in furtherance of any previous example, a computer-readable storage medium, comprising a plurality of instructions, that when executed, enable processing circuitry to process utilizing a 16 kilobytes (kB) region of the memory allocated for the one or more bitmaps, the 16 kB region comprising four 1 kB bitmaps allocated for MSRs, and two 4 kB bitmaps allocated for input/output (I/O) devices.

In a twenty-third example and in furtherance of any previous example, a computer-readable storage medium, comprising a plurality of instructions, that when executed, enable processing circuitry to disable write operations to a bitmap register associated with the bitmap based on the bit of the lock register being set.

In a twenty-fourth example and in furtherance of any previous example, a computer-readable storage medium, comprising a plurality of instructions, that when executed, enable processing circuitry to detect a system management interrupt (SMI), save a SMM save state in one or more model specific registers in response to the SMI, and set the bit of the lock register.

In a twenty-fifth example and in furtherance of any previous example, a computer-readable storage medium, comprising a plurality of instructions, that when executed, enable processing circuitry to process, as discussed above, wherein the computing resources comprising Input/Output (I/O) devices, model specific registers (MSRs), and central processing unit (CPU) registers.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory to store instructions, the memory comprising at least a 16 kilobyte (kB) region allocated to store a plurality of bitmaps, the plurality of bitmaps comprising at least four (4) 1 kB bitmaps associated with model specific registers (MSRs) and two (2) 4 kB bitmaps associated with a plurality of computing resources; and
   processing circuitry coupled with the memory, the processing circuitry to:
      detect an access request to access a computing resource of the plurality of computing resources while in a system management mode (SMM);
      determine a bit of a lock register is set to enable access to a one of the plurality of bitmaps associated with the computing resource of the plurality of computing resources, the bitmap to indicate an access policy for the computing resource;
      restrict changes to a bitmap register and the plurality of bitmaps in response to the bit of the lock register being set, wherein the bitmap register indicates a location of the region allocated to store the plurality of bitmaps;
      determine a location of the bitmap in the memory based on the bitmap register;
      determine whether the access request violates the access policy set in the bitmap;
      perform the access request if the access request does not violate the access policy; and
      cause a fault if the access request does violate the access policy.

2. The apparatus of claim 1, wherein the access policy specifies one or more access settings for the computing resource, the one or more access settings comprising an immutable setting, a write setting, a read-only setting, an executable setting, and an executable disabled setting.

3. The apparatus of claim 1, the processing circuitry to determine the bit of the lock register is not set to enable access to the bitmap register and the bitmap.

4. The apparatus of claim 1, the processing circuitry to detect a system management interrupt (SMI), save a SMM save state in one or more model specific registers in response to the SMI, and set the bit of the lock register.

5. The apparatus of claim 1, comprising one or more computing resources including the computing resource, wherein the one or more computing resources comprise Input/Output (I/O) devices, model specific registers (MSRs), and central processing unit (CPU) registers.

6. The apparatus of claim 1, comprising:
   a storage coupled with the memory and the processing circuitry, the storage to store data; and
   one or more input/output (I/O) devices coupled with the storage, the memory, and the processing circuitry, the one or more I/O devices configured to couple with one or more devices.

7. The apparatus of claim 1, wherein the lock register and the bitmap register are model specific registers (MSRs).

8. A computer-implemented method, comprising:
   detecting an access request to access a computing resource of a plurality of computing resources while in a system management mode (SMM);
   determining a bit of a lock register is set to enable access to a bitmap of a plurality of bitmaps associated with the computing resource of the plurality of computing resources, the bitmap to indicate an access policy for the computing resource;
   restricting changes to a bitmap register and the bitmap in response to the bit of the lock register being set, wherein the bitmap register indicates a location of the plurality of bitmaps in memory;
   determining the location of the bitmap in memory based on the bitmap register, the memory comprising at least a 16 kilobyte (kB) region allocated to store the plurality of bitmaps, the plurality of bitmaps comprising at least four (4) 1 kB bitmaps associated with a plurality of MSRs and two (2) 4 kB bitmaps associated with the plurality of computing resources;
   determining whether the access request violates the access policy set in the bitmap;
   performing the access request if the access request does not violate the access policy; and
   causing a fault if the access request does violate the access policy.

9. The computer-implemented method of claim 8, wherein the access policy specifies one or more access settings for the computing resource, the one or more access settings comprising an immutable setting, a write setting, a read-only setting, an executable setting, and an executable disabled setting.

10. The computer-implemented method of claim 8, comprising determining the bit of the lock register is not set to enable access to the bitmap and cause a fault to indicate an error.

11. The computer-implemented method of claim 8, comprising detecting a system management interrupt (SMI), saving a SMM save state in one or more model specific registers in response to the SMI, and set the bit of the lock register.

12. The computer-implemented method of claim 8, wherein one or more computing resources including the computing resource, comprise Input/Output (I/O) devices, model specific registers (MSRs), and central processing unit (CPU) registers.

13. The computer-implemented method of claim 8, wherein the lock register and the bitmap register are model specific registers (MSRs).

14. A non-transitory computer-readable storage medium, comprising a plurality of instructions, that when executed, enable processing circuitry to:
   detect an access request to access a computing resource of a plurality of computing resources while in a system management mode (SMM);

determine a bit of a lock register is set to enable access to a one of a plurality of bitmaps associated with the computing resource of the plurality of computing resources, the bitmap to indicate an access policy for the computing resource;

restrict changes to a bitmap register and the plurality of bitmaps in response to the bit of the lock register being set, wherein the bitmap register indicates a location of the plurality of bitmaps;

determine a location of the bitmap in memory based on the location indicated in the bitmap register;

determine whether the access request violates the access policy set in the bitmap;

perform the access request if the access request does not violate the access policy; and cause a fault if the access request does violate the access policy.

15. The non-transitory computer-readable storage medium of claim 14, wherein the access policy specifies one or more access settings for the computing resource, the one or more access settings comprising an immutable setting, a write setting, a read-only setting, an executable setting, and an executable disabled setting.

16. The non-transitory computer-readable storage medium of claim 15, comprising a plurality of instructions, that when executed, enable processing circuitry to determine the bit of the lock register is not set to enable access to the bitmap and cause a fault to indicate an error.

17. The non-transitory computer-readable storage medium of claim 15, comprising a plurality of instructions, that when executed, enable processing circuitry to detect a system management interrupt (SMI), save a SMM save state in one or more model specific registers in response to the SMI, and set the bit of the lock register.

18. The non-transitory computer-readable storage medium of claim 15, wherein the computing resources comprise Input/Output (I/O) devices, model specific registers (MSRs), and central processing unit (CPU) registers.

19. The non-transitory computer-readable storage medium of claim 15, wherein the plurality of bitmaps comprise at least four (4) 1 kB bitmaps associated with a plurality of model specific registers (MSRs) and two (2) 4 kB bitmaps associated with the plurality of computing resources.

20. The non-transitory computer-readable storage medium of claim 15, wherein the lock register and the bitmap register are model specific registers (MSRs).

* * * * *

UNITED STATES PATENT AND TRADEMARK OFFICE
CERTIFICATE OF CORRECTION

| | |
|---|---|
| PATENT NO. | : 11,783,064 B2 |
| APPLICATION NO. | : 15/941992 |
| DATED | : October 10, 2023 |
| INVENTOR(S) | : Kirk D. Brannock et al. |

It is certified that error appears in the above-identified patent and that said Letters Patent is hereby corrected as shown below:

On the Title Page

Under item (73):
Please change Assignee city name Sant Clara to Santa Clara.

Signed and Sealed this
Eleventh Day of June, 2024

Katherine Kelly Vidal
*Director of the United States Patent and Trademark Office*